US008183994B2

(12) United States Patent
Staab

(10) Patent No.: US 8,183,994 B2
(45) Date of Patent: May 22, 2012

(54) FLEXIBLE, SCALABLE, SERVICE-ORIENTED SURVEILLANCE SYSTEM ARCHITECTURE

(75) Inventor: Torsten Albert Staab, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 218 days.

(21) Appl. No.: 11/857,333

(22) Filed: Sep. 18, 2007

(65) Prior Publication Data

US 2009/0072965 A1 Mar. 19, 2009

(51) Int. Cl.
*G08B 1/00* (2006.01)

(52) U.S. Cl. .............. 340/531; 340/568.1; 340/539.25; 340/572.1

(58) Field of Classification Search .......... 340/531, 340/568.1, 572.1, 572.3, 532–535, 538.11–538.12, 340/539.21–539.25
See application file for complete search history.

(56) References Cited

U.S. PATENT DOCUMENTS

| | | | | |
|---|---|---|---|---|
| 4,236,234 A * | 11/1980 | McDavid et al. | | 367/77 |
| 6,112,206 A | 8/2000 | Morris et al. | | |
| 6,144,651 A * | 11/2000 | Rinchiuso et al. | | 370/335 |
| 6,148,219 A * | 11/2000 | Engelbrecht et al. | | 455/456.2 |
| 6,173,230 B1 * | 1/2001 | Camus et al. | | 701/120 |
| 6,191,587 B1 * | 2/2001 | Fox | | 324/350 |
| 6,370,637 B1 * | 4/2002 | Meier et al. | | 712/215 |
| 6,564,127 B1 | 5/2003 | Bauerle et al. | | |
| 6,611,142 B1 * | 8/2003 | Jones et al. | | 324/261 |
| 6,626,361 B2 | 9/2003 | Hileman | | |
| 6,711,535 B2 * | 3/2004 | Ford et al. | | 704/1 |
| 6,741,681 B2 * | 5/2004 | Meyer | | 379/93.12 |
| 6,771,969 B1 | 8/2004 | Chinoy et al. | | |
| 6,901,262 B2 | 5/2005 | Allison et al. | | |
| 6,915,216 B2 * | 7/2005 | Troxler et al. | | 702/33 |
| 6,999,876 B2 | 2/2006 | Lambert et al. | | |
| 7,289,964 B1 * | 10/2007 | Bowman-Amuah | | 705/1.1 |
| 7,411,865 B2 * | 8/2008 | Calhoun | | 367/124 |
| 7,716,286 B2 * | 5/2010 | Heins et al. | | 709/204 |
| 2004/0119591 A1 | 6/2004 | Peeters | | |
| 2005/0243173 A1 | 11/2005 | Levine et al. | | |
| 2006/0026017 A1 | 2/2006 | Walker | | |
| 2006/0071775 A1 * | 4/2006 | Otto et al. | | 340/531 |
| 2006/0253477 A1 | 11/2006 | Maranhao | | |

* cited by examiner

*Primary Examiner* — Daniel Previl
(74) *Attorney, Agent, or Firm* — John P. O'Banion; Meredith H. Schoenfeld

(57) ABSTRACT

A surveillance architecture having applications in a wide variety of surveillance-related applications is disclosed. This architecture can be used in various surveillance scenarios, including, but not limited to, chemical, biological, radiological surveillance and physical security, is highly scalable and allows for rapid, plug-and-play field data/sample acquisition and local and remote sharing of system resources. By design, the architecture also fosters fault tolerance and allows users to quickly deploy and establish ad hoc, semi-permanent, and permanent surveillance systems. Furthermore, the architecture's service-oriented approach allows for rapid, on-the-fly, plug-and-play integration and dynamic harvesting of heterogeneous surveillance technologies (e.g., sensors, handheld data acquisition devices, analytical instrumentation, and so forth).

26 Claims, 9 Drawing Sheets

FLEXIBLE, SCALABLE, SERVICE-ORIENTED SURVEILLANCE SYSTEM ARCHITECTURE

STATEMENT REGARDING FEDERALLY SPONSORED RESEARCH OR DEVELOPMENT

This invention was made with Government support under Contract No. DE-AC52-06NA25396. The Government has certain rights in this invention.

CROSS-REFERENCE TO RELATED APPLICATIONS

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to optimizing environmental surveillance efforts, and more particularly to a flexible system architecture for local and remote resource management, allocation, and sharing, as well as sample and data acquisition, in various types of environmental surveillance efforts.

2. Description of Related Art

Existing surveillance systems, such as the Global Avian Influenza Network for Surveillance, heavily rely on a network of human operators for collecting field samples (e.g., animal, human, plant, water, soil, air), analyzing them, and reporting results and observations using available media, including print and electronic media. Depending on the type of sampling, field investigators may have to carry a significant amount of equipment into the field to perform their jobs. In addition, the devices are usually operated in standalone mode due to software limitations, hardware limitations, compatibility issues, or any combination thereof.

Such operation prevents the devices and operators from sharing valuable resources and information in real-time while in the field. For example, a sample collector may be equipped with a resource, such as portable barcode label printer, that another field investigator lacks. If that second field investigator were in the vicinity, he could utilize the printer as well. However, due to standalone mode operation, the second field investigator does not have access to that resource and, in fact, is not likely to know that the useful resource is nearby. This lack of situational awareness, collective intelligence, and inflexibility with respect to ad hoc, real-time resource and information sharing is commonplace in today's surveillance systems.

Thus, environmental surveillance today is a disjoint and relatively uncoordinated process. Small scale (i.e., less than 100,000 samples), localized, environmental sampling efforts, such as those occurring during the 2001 Anthrax letters occurrence, have clearly showed that traditional sampling strategies and approaches were not up to the task. In a bioterrorism attack in a major city, or in a global epidemic, (e.g., H5N1-inspired), millions of people and animals would have to be sampled as quickly as possible. Current environmental systems do not provide the level of scalability, flexibility, connectivity, and resilience/fault tolerance necessary to face challenges of this magnitude.

BRIEF SUMMARY OF THE INVENTION

The present invention is a flexible, highly scalable surveillance system architecture that can be applied to a wide variety of field-based surveillance activities. The system architecture is applicable to a variety of systems, including chemical, biological, and radiological field data and sample acquisition.

The system architecture is highly scalable, and can be used in surveillance efforts of varying scale (small up to very large) in a wide variety of surveillance efforts (e.g., biological, chemical, and radiological surveillance). Fault tolerant and resilient operation is provided through service-oriented, real-time, network-wide exploration, which eliminates single point of failures.

The architecture enables on-site and off-site personnel to share any of a multitude of heterogeneous, local, and remote resources, or any combination thereof (e.g., communication links, field equipment) and allows collaborative, ad hoc grid computing in the field. On-site and off-site situational awareness is significantly improved by the use of multimedia data acquisition, real-time data fusion and streaming.

The service-oriented approach in the system architecture of the present invention provides a necessary level of software and hardware abstraction to enable structured, ad-hoc deployment and plug-and-play operation of heterogeneous surveillance systems and devices. Further, this approach simplifies resource sharing in the field, which can lower costs, lower the amount of deployed instrumentation, and increase fault tolerance.

The system architecture provides point-to-point and multi-point broadcasting and information routing, which enables each individual field node to extend its communication reach beyond that allowed in its original design, which increases surveillance area coverage and helps to eliminate single point of failures.

An aspect of the invention is a flexible, service-oriented surveillance system architecture, comprising: a network; and at least one Field Data/Sample Acquisition Device (FDSAD); wherein unique capabilities of the FDSAD are accessible through the network.

In one embodiment of this aspect, the FDSAD provides a local user interface, a remote user interface, or a combination thereof. In another embodiment, the FDSAD provides local data storage, import capabilities and export capabilities; remote data storage, import capabilities, and export capabilities, or any combination thereof. In another embodiment, the FDSAD provides storage capabilities for field samples, sampling supplies, other sample-related information, or any combination thereof. In another embodiment, the FDSAD is utilized by one or more users simultaneously for information collection.

In yet another embodiment, the architecture further comprises at least one Service Station; wherein the at least one Service Station manages access, information, and data from and related to the at least one FDSAD. One mode of this embodiment further comprises one or more system resources; wherein resources are assigned to a Service Station and are locally or remotely accessible to other Service Stations and FDSADs; and in a further mode, resources are dynamically located by Service Stations and FDSADs.

In another embodiment of this aspect, the Service Station relays information from other Service Stations or FDSADs; and communication ranges for Service Stations and FDSADs are extended. In another embodiment, 1-n, n-to-1, and n-to-m communication between Service Stations and FDSADs is allowed. In another embodiment, Service Stations and FDSADs subscribe to and share internal, external, physical, and electronic services, or any combination thereof.

Another embodiment further comprises one or more local or remote systems; wherein the local or remote systems subscribe to Service Stations, FDSADS, or any combination; and wherein the local or remote systems publish multimedia streams to and from Service Stations and FDSADs.

In yet another embodiment, the Service Station provides a local user interface, a remote user interface, or a combination thereof. In another embodiment, the Service Station provides local data storage, import capabilities and export capabilities; remote data storage, import capabilities, and export capabilities, or any combination thereof. In another embodiment, the Service Station provides storage capabilities for field samples, sampling supplies, other sample-related information, or any combination thereof. In still another embodiment, the FDSAD is utilized by one or more users simultaneously for information collection.

Another aspect of the invention is a flexible, service-oriented surveillance system architecture, comprising: a network; and one or more devices in communication with the network; wherein at least one of the devices is a Field Data/Sample Acquisition Device (FDSAD); wherein the FDSAD communicates with the network regarding other devices on the network.

In one embodiment of this aspect, the FDSAD utilizes one or more devices on the network for information collection or information processing.

Yet another aspect of the invention is a system for resource management, comprising: a network; one or more resources accessible through the network; and at least one Field Data/Sample Acquisition Device (FDSAD); and at least one Service Station; wherein resources are assigned to the Service Station; and wherein resources are locally or remotely accessible to other Service Stations and to FDSADs on the network.

In one embodiment of this aspect, at least one network connection is wireless; and other FDSADs or Service Stations relay information wirelessly to extend communication ranges of the network.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 5:
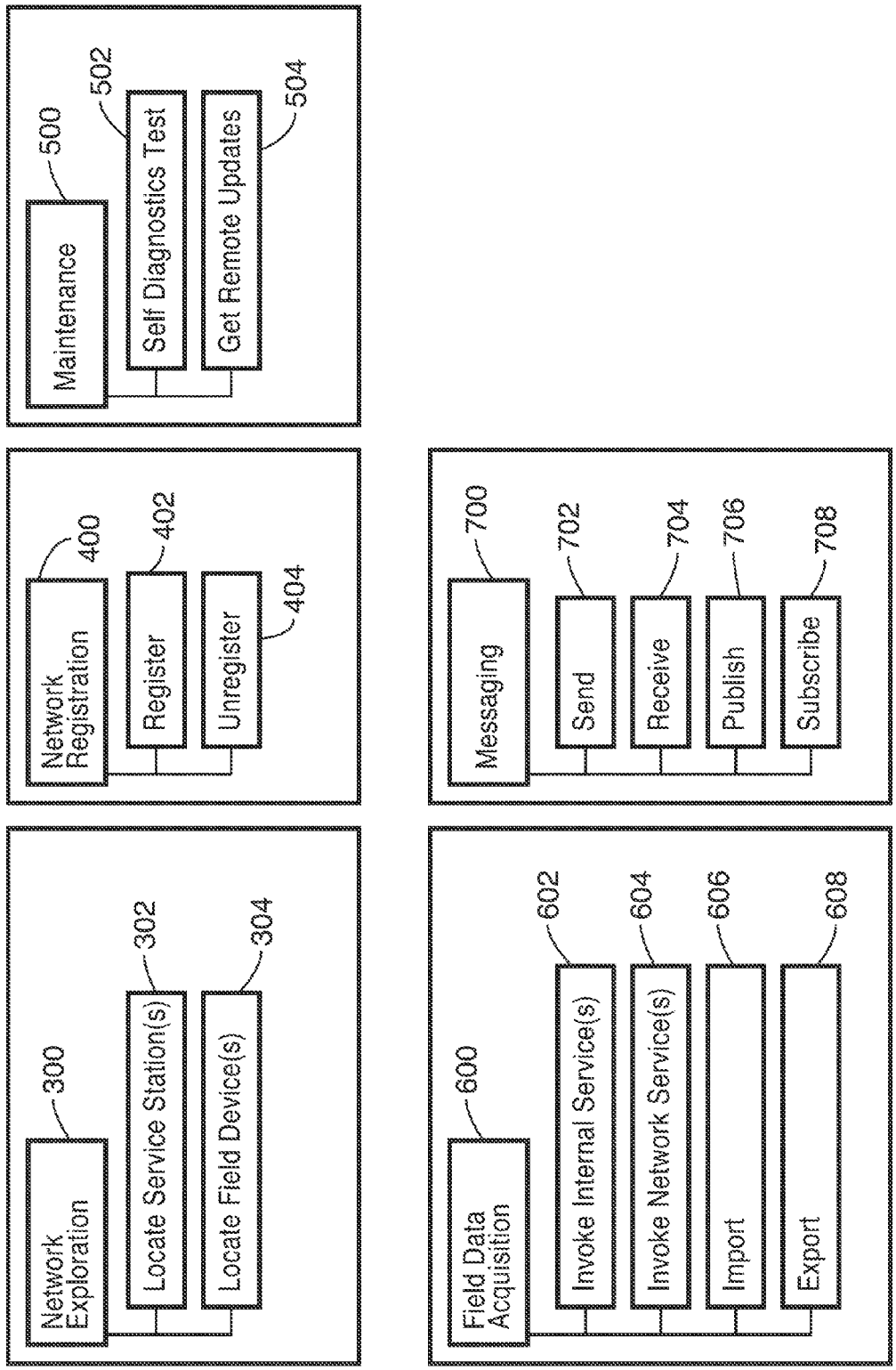

FIG. 5 outlines a core service set of a Service Station according to one embodiment of the present invention.

Figure 6:
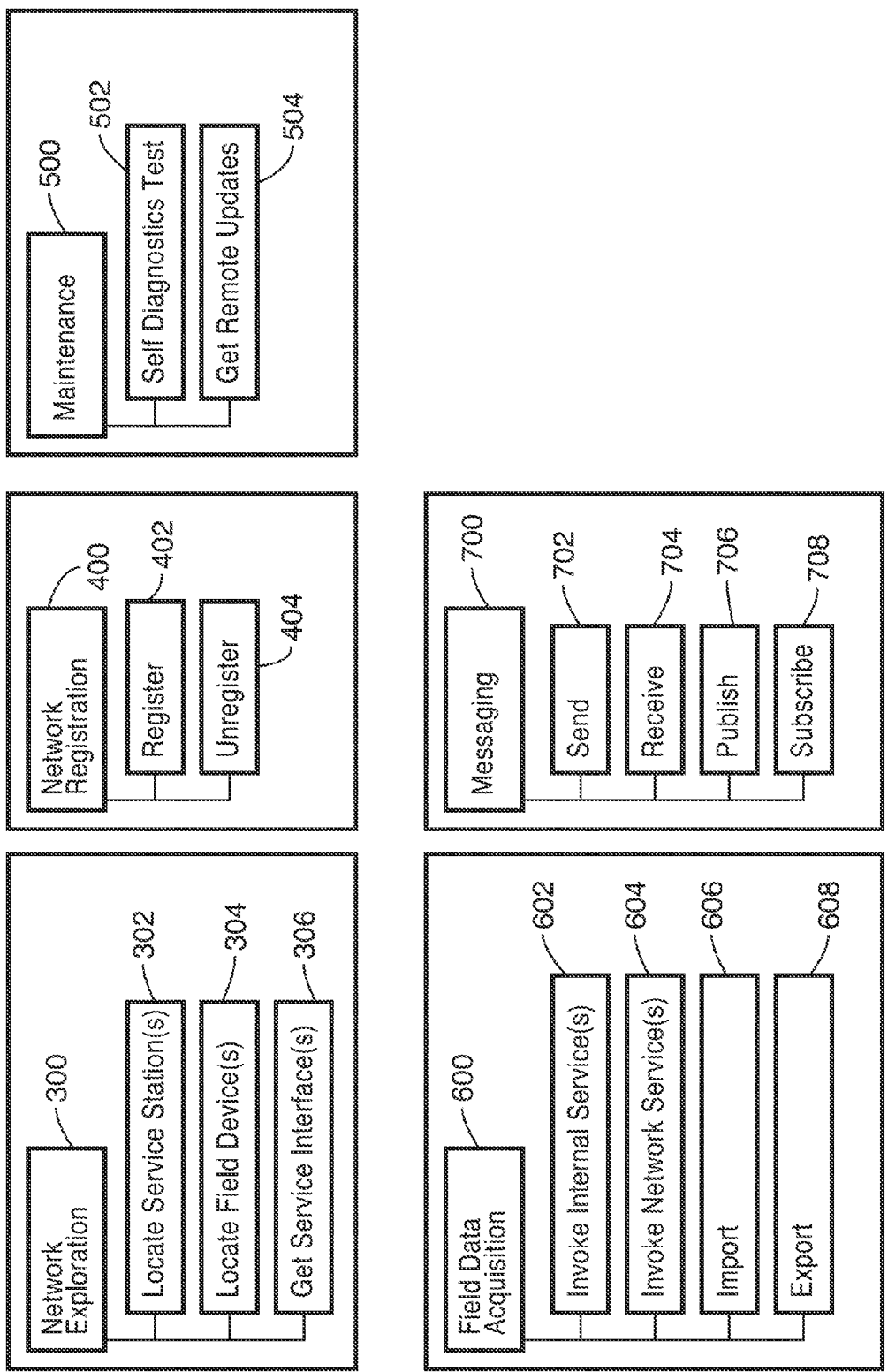

FIG. 6 outlines a core service set of a FDSAD according to one embodiment of the present invention.

DETAILED DESCRIPTION OF THE INVENTION

Referring more specifically to the drawings, for illustrative purposes the present invention is embodied in the apparatus generally shown in FIG. 1 through FIG. 6. It will be appreciated that the apparatus may vary as to configuration and as to details of the parts, and that the method may vary as to the specific steps and sequence, without departing from the basic concepts as disclosed herein.

Figure 1:
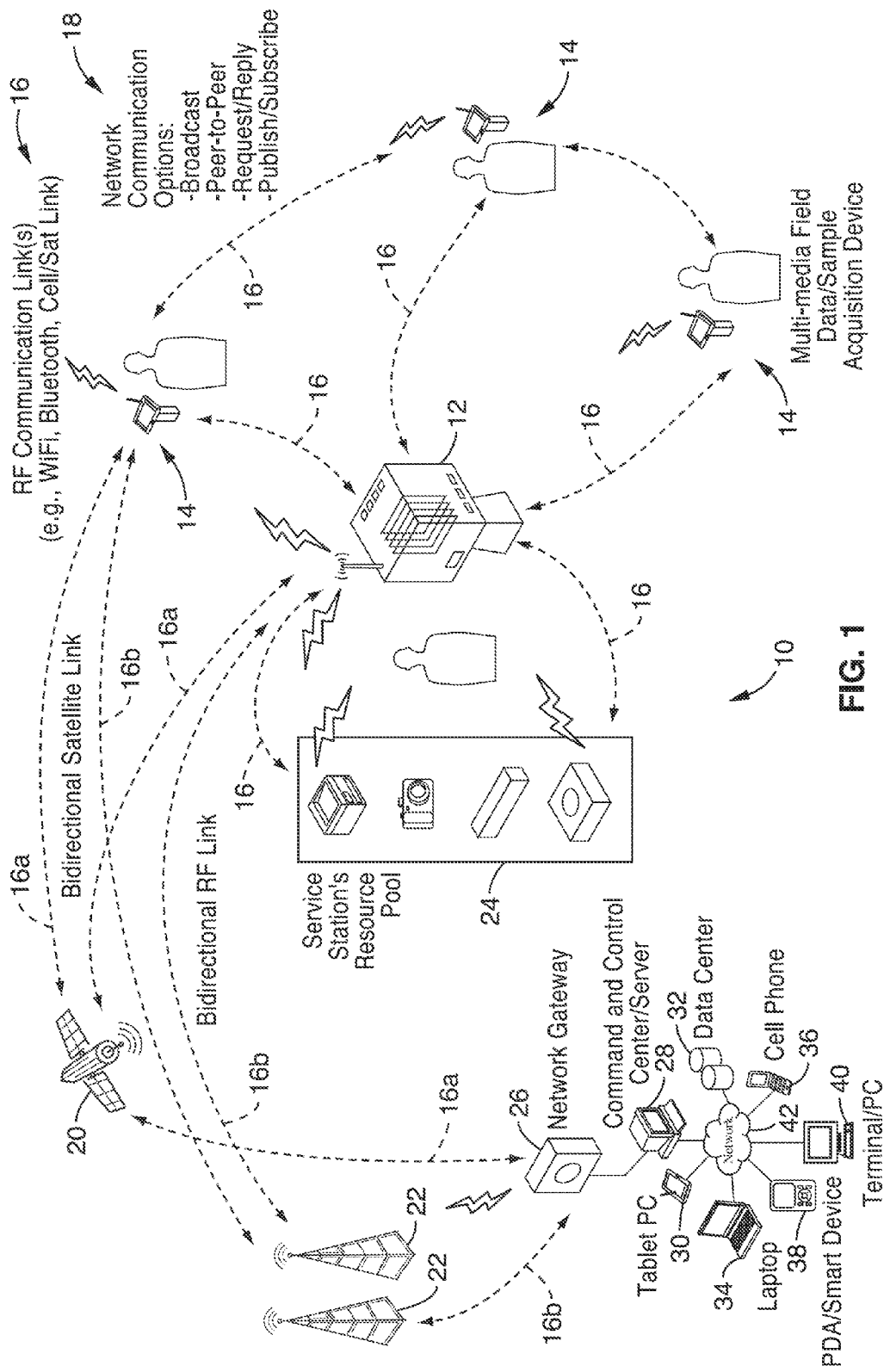
FIG. 1 is a depiction of an embodiment of a system architecture according to the present invention.
Figure 2:
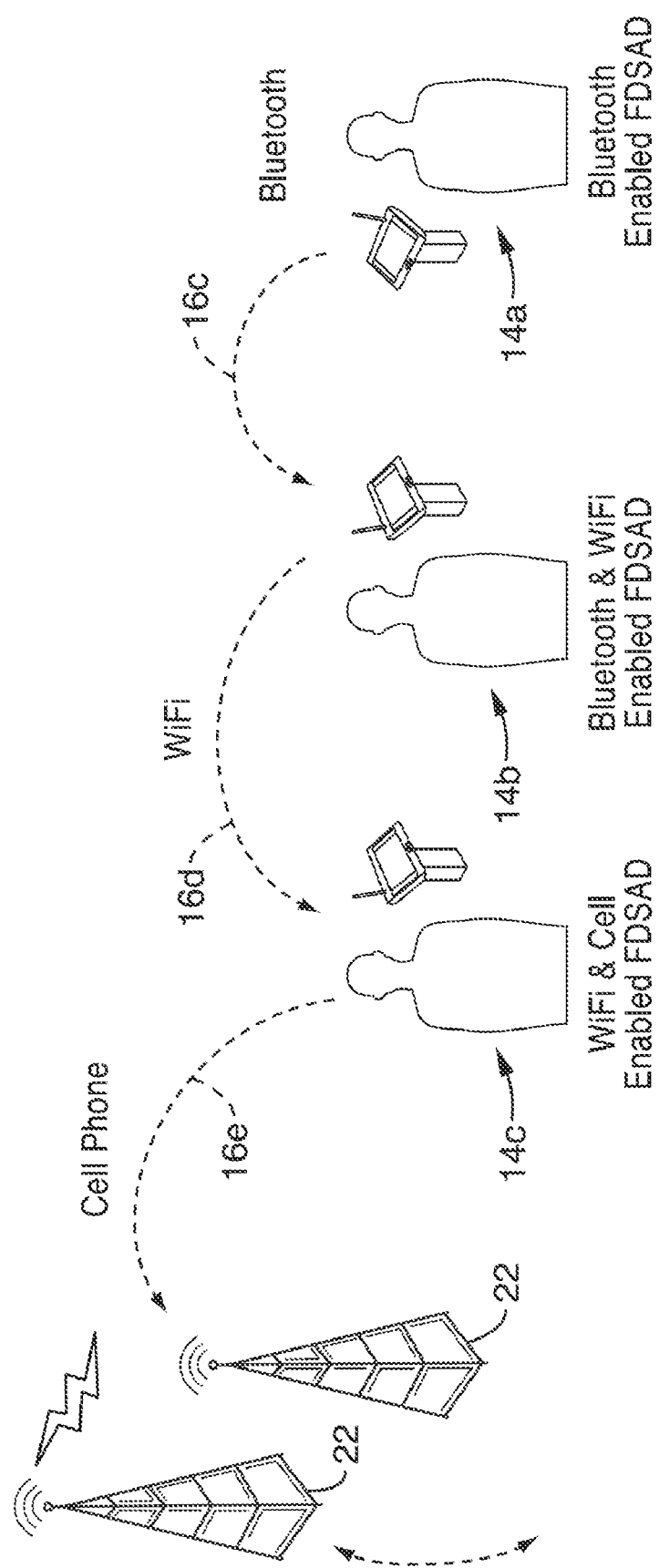
FIG. 2 is a depiction of an example of extending communication reach in the architecture of the present invention.

Referring to FIG. 1, the system architecture 10 includes two types of system participants, Service Stations (SS) 12 and Field Data/Sample Acquisition Devices (FDSAD) 14 that communicate over radio frequency (RF) communications links 16 (e.g., WiFi, Bluetooth, cell/sat link) using a network communications option 18 selected from broadcast, peer-to-peer, request/replay, and publish/subscribe. FIG. 1 illustrates bidirectional satellite links 16a and bidirectional RF links 16b as included in the communications links 16, as well as a satellite 20 and RF transmission towers 22. A service station resource pool 24 is also shown associated with Service Station 12. FIG. 1 also illustrates a network gateway 26, a command and control center/server 28, a tablet PC 30, a data center 32, a laptop 34, a cell phone 36, a PDA/smart device 38, and a terminal/PC 40, all connected to a network 42.

A Service Station can be either mobile or stationary, and can serve multiple purposes, such as manual or fully automatic field data aggregation from FDSADs; acting as a wire-based and/or wireless-communication gateway, hub, and/or router for FDSADs and other local or remote Information Management Systems (IMS); provide field maintenance services for FDSADs, such as battery changing ports, storage for field supplies and/or samples; and sharing of system resources, such as label printers, barcode or Radio Frequency Identification (RFID) readers, and other instrumentation. One of many possible embodiments of a Service Station may include a PC (which may be a desktop, laptop, tablet, or other type of computer) with a wireless communication interface, such as a satellite- or cellular phone-based data link; a multimedia memory card reader for manual data import and export; and a touch screen.

Like Service Stations, FDSADs can serve multiple purposes, such as multimedia field data acquisition and/or sample collection (e.g., samples from humans, animals, plants, water, gas, soils, or air). FDSADs can be either mobile or stationary. An FDSAD can be as simple as a personal data assistant (PDA), a smart phone, or a laptop, or as complex as a mobile robot capable of doing in-situ sample analysis. In one embodiment of the instant invention, an FDSAD can function as both a Service Station and an FDSAD.

For example, assume that at least two FDSADs are wirelessly connected via a Bluetooth Radio Frequency (RF) (or a wireless Universal Serial Bus (USB)) interface. Furthermore, assume that one of the FDSADs has additional remote data transmission capabilities via an integrated cellular phone, while the other does not. The cellular phone-equipped FDSAD could share its additional capabilities with the other FDSAD(s) by providing a Bluetooth-accessible cellular phone-based data upload/download service.

Enabling nodes, such as Service Stations and FDSADs, to piggyback on each others' resources/services provides numerous advantages. For example, instead of deploying 100 FDSADs, each equipped with an integrated cellular phone, one could deploy 10 FDSADs equipped with an integrated cellular phone and 90 FDSADs not so equipped, and allow the 90 non-equipped FDSADs permission and access to the 10 equipped FDSADs when needed. This alternate deployment could considerably reduce the overall deployment cost of large-scale surveillance efforts. Dynamic resource sharing like this could also improve the communication reach of individual nodes (see, e.g., FIG. 2) and, in addition, improve the surveillance network's overall fault tolerance. For example, in FIG. 2 a Bluetooth enabled FDSAD 14a is shown communicating to a Bluetooth and WiFi enabled FDSAD 14b over a Bluetooth link 16c. FDSAD 14b is in turn shown communicating to a WiFi and cell enabled FDSAD 14c over a WiFi link 16c. FDSAD 14c is in turn shown communicating to transmission towers 22 over a cell phone link 16e.

It is important to note that the system architecture of the present invention does not limit the number of participating Service Stations and FDSADs. Nodes can be added and removed on-the-fly, providing scalability, flexibility, and fault tolerance. In addition, the system architecture neither enforces nor implies the usage of a certain control hierarchy or topology (e.g., client/server or peer-to-peer), nor does it require the use of Service Stations. A minimal embodiment of the surveillance system, for example, could consist of a single FDSAD.

The system does not make any assumptions regarding the type of communication interfaces available in an FDSAD. Some FDSADs may provide a number of different communication interfaces, such as WiFi, cellular phone, Ethernet, wireless USB, or Bluetooth. The communication scheme shown in FIG. 2, for example, could include a wireless USB interface instead of Bluetooth, WiFi, or cellphone. Other FDSADs may not provide any means for one-way or two-way electronic communications. For example, a simple paper notebook could be considered a FDSAD. One way to feed this type of information into the system could be entering or scanning the notebook information via another FDSAD or Service Station. Therefore, the architecture of the present invention allows a system operator to deploy a wide variety of FDSADs of varying degree of sophistication.

By applying a Service Oriented Architecture (SOA) approach to surveillance, FDSAD complexities are hidden from the system in the form of service interfaces. Abstraction at the service layer allows ad-hoc networking and integration of highly diverse surveillance equipment. A wireless barcode reader, for example, could function as a mobile FDSAD. This particular FDSAD would provide a barcode reading service to authorized users of other FDSADs. The local (or remote) user or FDSAD should not need to worry about what particular brand of barcode reader is being used, as long as the unit meets the required quality of service standards.

FDSAD and Service Station services could be easily described and electronically exchanged via commonly accepted, machine readable metadata interface description and data modeling standards, such as, but not limited to, Web Service Description Language (WSDL) and eXtensible Markup Language (XML). Using metadata to describe system/device services and data provides for the necessary level of hardware and software abstraction. It also prevents potential vendor lock-in, ensures interoperability in heterogeneous surveillance environments, and allows for easy, on-the-fly integration of legacy systems and emerging surveillance technologies. FDSADs (and Service Stations) can be either online or offline at any time, especially during large-scale, multi-agency surveillance environments. Offline situations, for example, can occur when an FDSAD or Service Station exceeds its communication range, has a hardware malfunction, is down for maintenance, and so forth. Coordinating such efforts requires real-time inventory/resource management while avoiding a single point of failures. Thus, the system of the proposed system is designed to provide the flexibility, scalability, and fault tolerance necessary for mission critical surveillance systems.

Figure 3A:
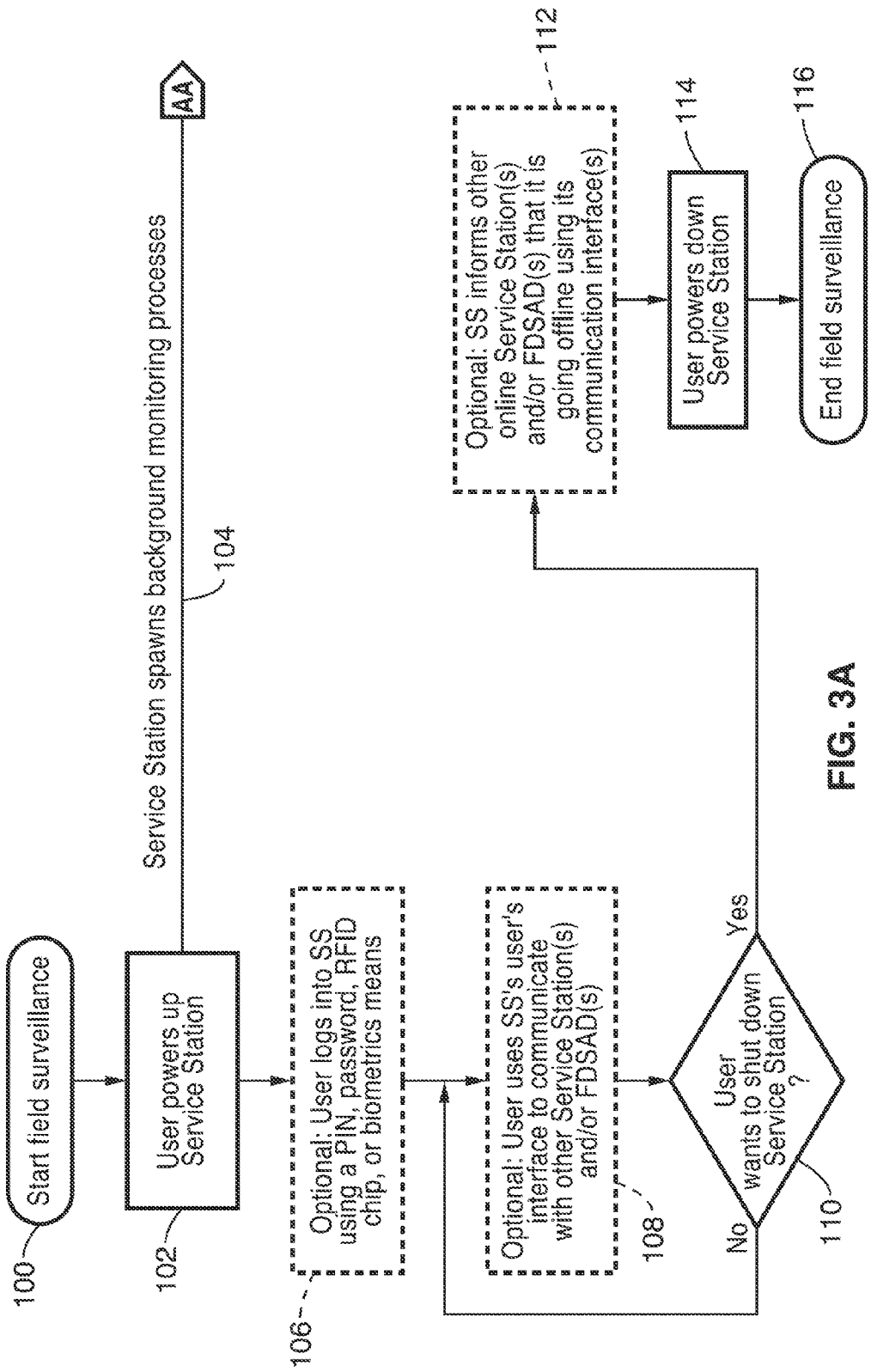
FIGS. 3A-3B show a flow chart of an embodiment of a Service Station.
Figure 3B:
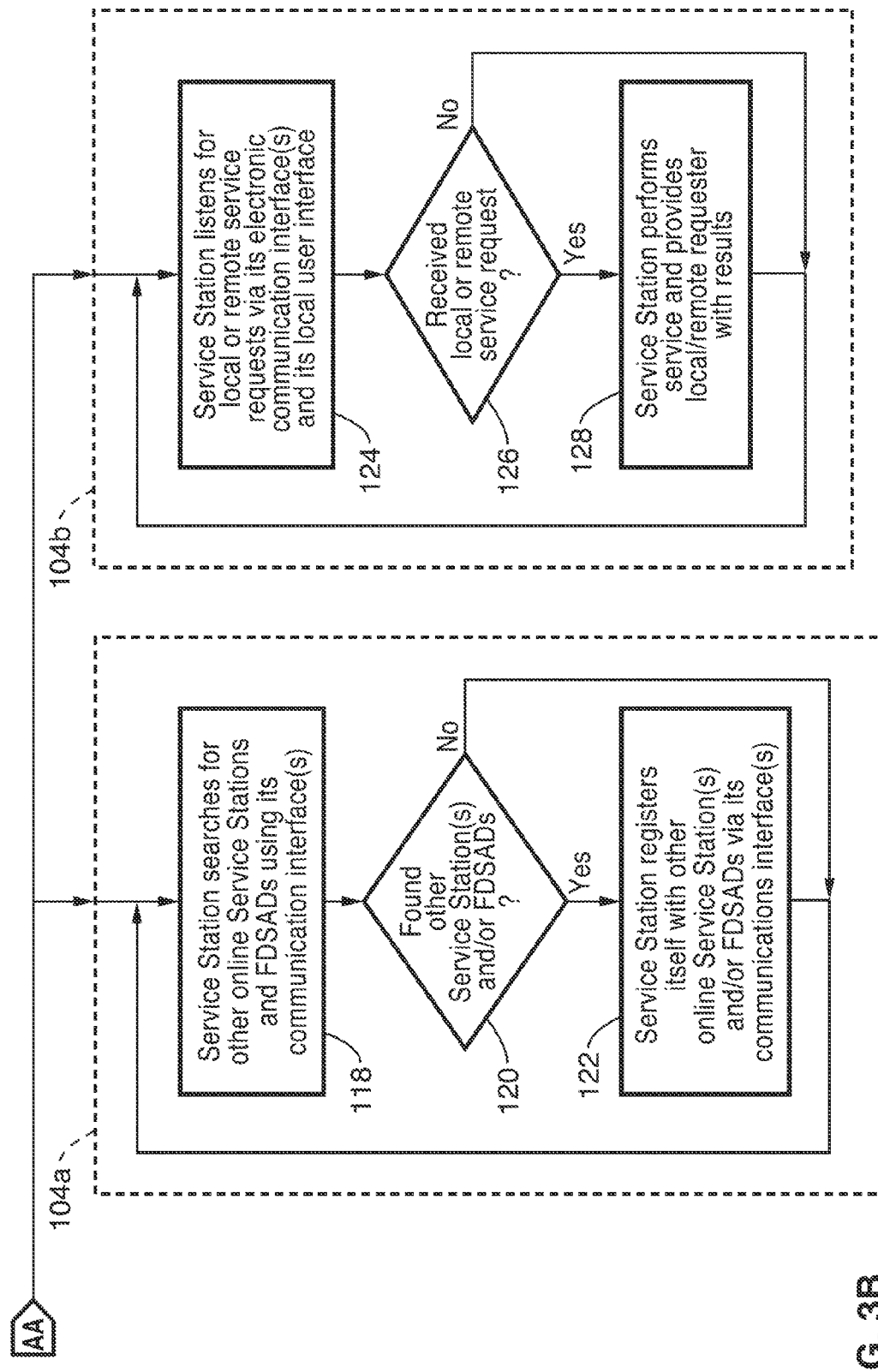

FIGS. 3A-3B provide a process model, or flowchart, of an embodiment of a Service Station according to the architecture of the present invention.

Referring to FIG. 3A, in the course of field surveillance, the Service Station is powered on. In one embodiment, a user logs into the Service Station using passwords, biometrics, or other means. The user may use the Service Station's interface to communicate with one or more Service Stations and/or FDSADs on the network. The Service Station monitors whether the user wishes to power down the Service Station. If a shut down command is received from the user, the Service Station shuts down. In a preferred embodiment, prior to shutting down, the Service Station uses its communication interface to inform other online Service Stations and/or FDSADs that it is going offline. The shutdown (i.e., "going offline") notification, for example, could be easily implemented via point-to-point messaging, broadcasting, or de-registration from a networked, system-wide service provider registry (i.e., "yellow page") process. Note that a similar notification could be required whenever a new FDSAD or Service Stations becomes operational (i.e., "goes online") to notify other FDSADs and/or Service Stations of its existence and/or availability.

Upon activation, the Service Station spawns monitoring processes in the background, shown in FIG. 3B. This embodiment includes, but is not limited to, two background processes. In one process, the Service Station searches for other Service Stations and FDSADs using its communication interface and registers its presence with any Service Stations and FDSADs found. In another process, the Service Station monitors the network for local or remote service requests using its electronic communication interface and its local user interface. If such a request is received, the Service Station performs the requested service and provides results to the requester. Thus, in this embodiment, one background process is concerned with other Service Stations and FDSADs on the network, and another background process is concerned with the handling of and responses to service requests.

Referring again to FIG. 3A, the process begins at start field surveillance block 100. Next, the user powers up the Service Station at block 102 which spawns background monitoring processes 104 shown in FIG. 3B. Optionally the user logs into the Service Station using a PIN, password, RFID chip, or biometric means shown at block 106. Optionally, the user uses the Service Station's user's interface to communication with other Service Station(s) and/or FDSAD(s) as shown at block 108. At block 110, the Service Station monitors whether the user wants to power down the Service Station. If so, the user powers down the Service Station at block 114 and ends field surveillance at block 116. Optionally, prior to shut down, the Service Station uses its communications interface(s) to inform other online Service Station(s) and/or FDSAD(s) that it is going offline as shown at block 112.

Referring again to FIG. 3B, two background processes 104a, 104b are illustrated. In process 104a, the Service Station searches for other Service Stations and FDSADs using its communication interface(s) as shown at block 118. If other Service Station(s) or FDSADs are found, block 120, then the Service Station registers itself with other online Service Station(s) and/or FDSADs via its communications interface(s) as shown at block 122. In process 104b, the Service Station listens for local or remote service requests via its electronic communications interface(s) and its local user interface as shown at block 124. If a local or remote service request is received, block 126, then the Service Station performs service and provides the local/remote requestor with results as shown at block 128.

Figure 4A:
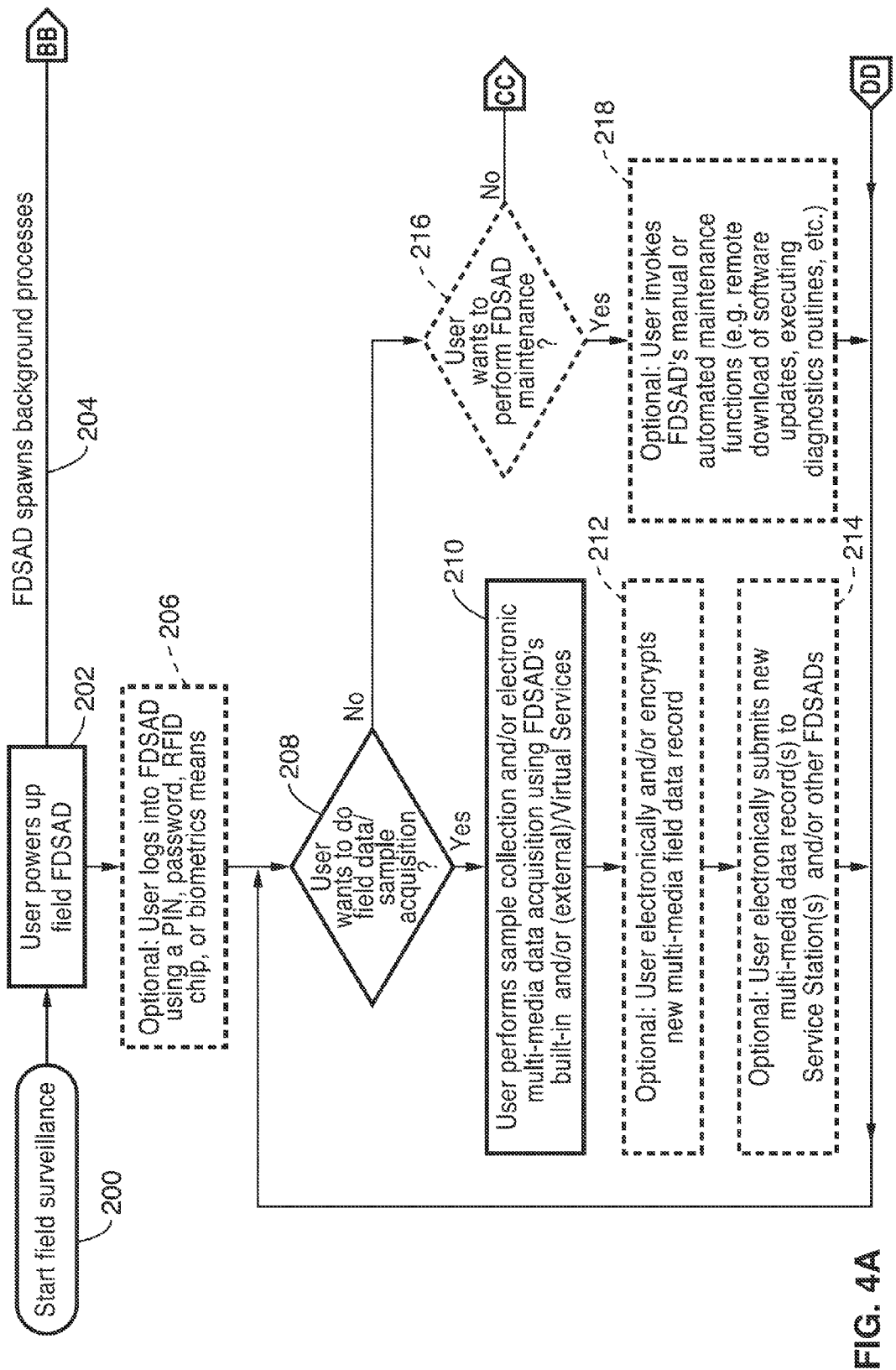
FIGS. 4A-4C show a flow chart of an embodiment of a FDSAD.
Figure 4B:
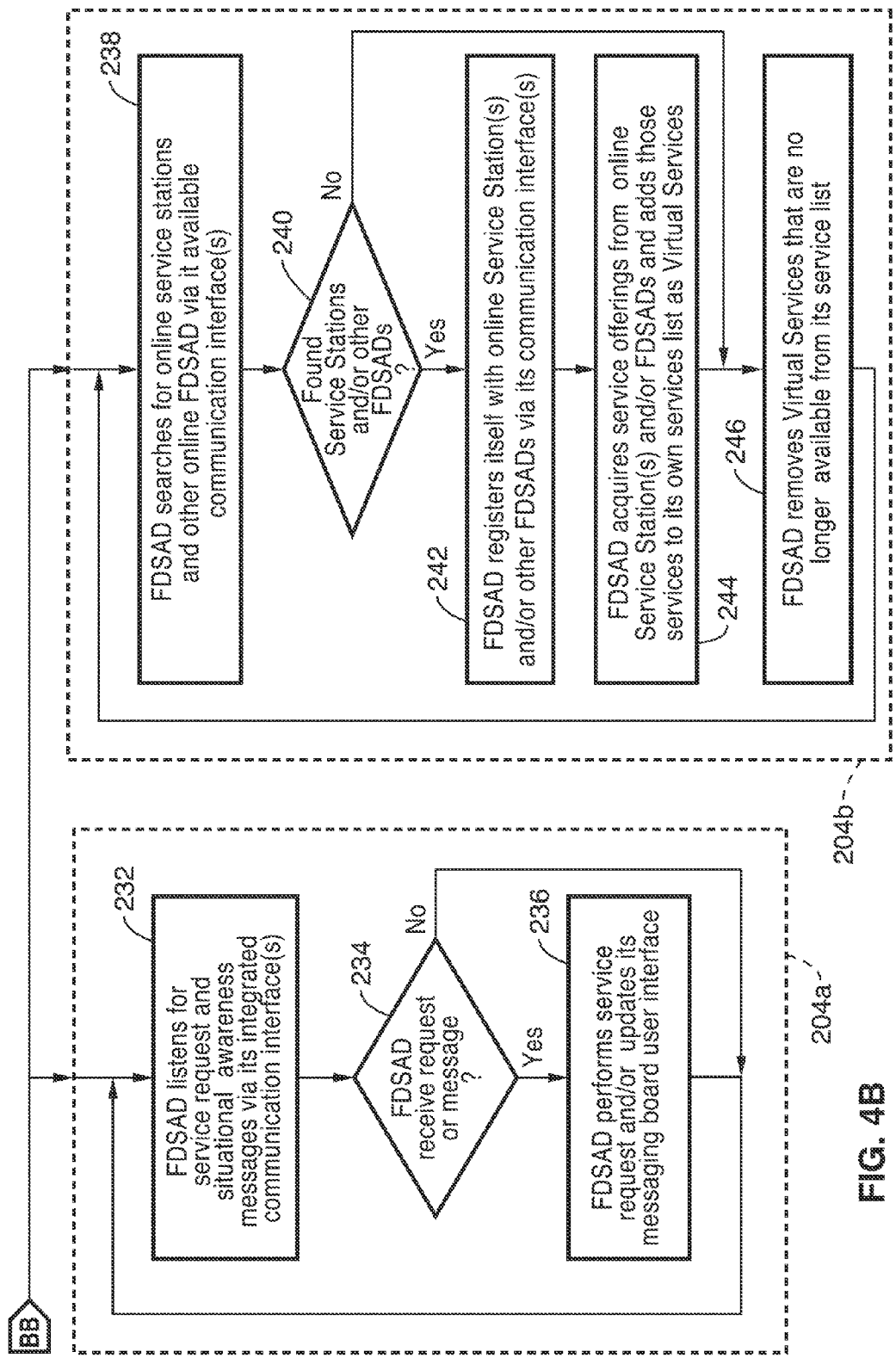
Figure 4C:
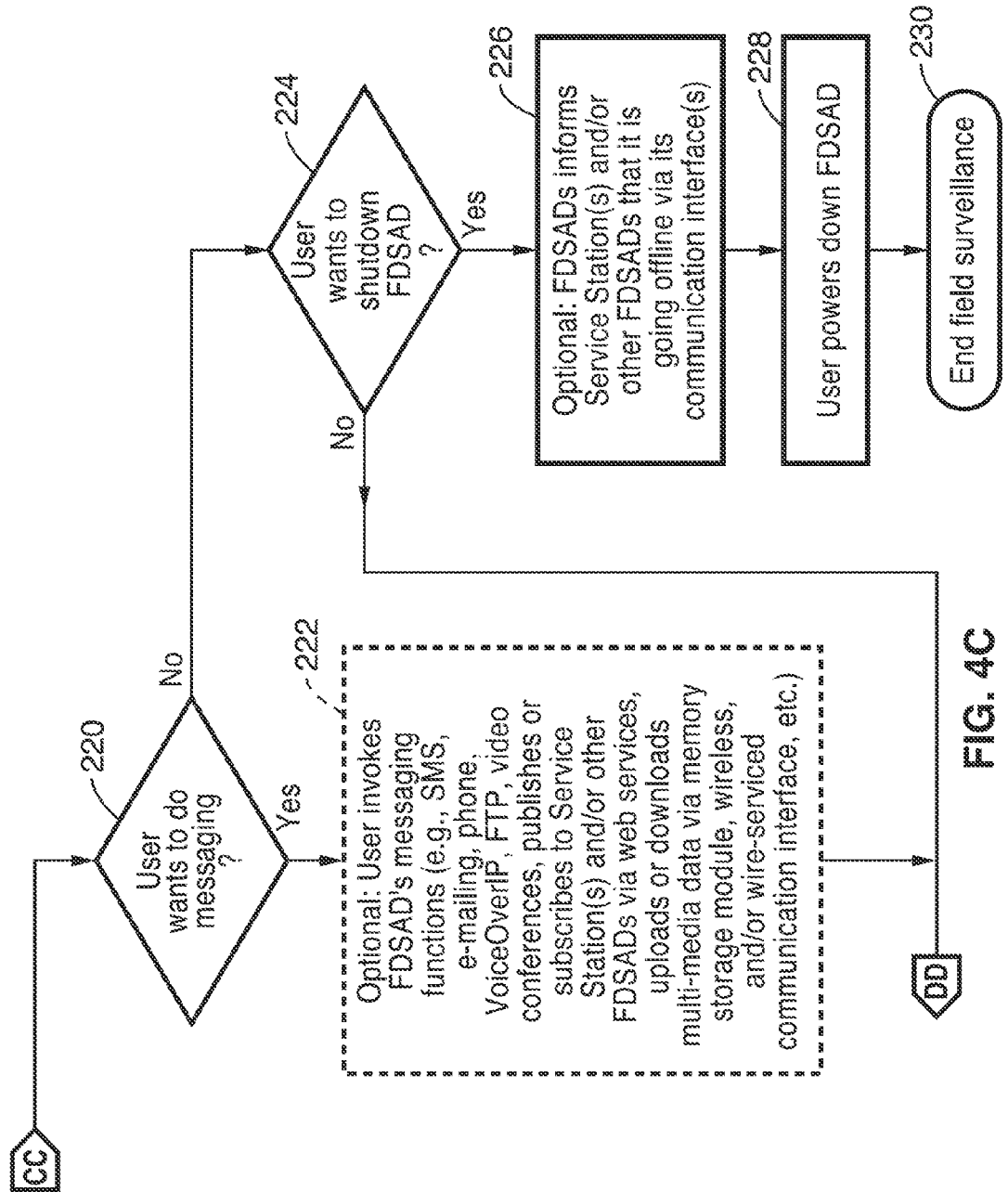

FIGS. 4A-4C provide a process model, or flowchart, of an FDSAD according to the architecture of the present invention.

Referring to FIG. 4A, in the course of field surveillance, the FDSAD is powered on. In one embodiment, a user logs into the FDSAD using passwords, biometrics, or other means. If desired, the user can perform sample collection, electronic multimedia data acquisition, or a combination thereof, using the FDSAD's built-in, external, or virtual services. The FDSAD monitors whether the user wishes to power down the FDSAD. If a shut down command is received from the user, the FDSAD shuts down. In a preferred embodiment, prior to shutting down, the FDSAD uses its communication interface to inform other online Service Stations and/or FDSADs that it is going offline.

Various optional functions are available to a user, depending on the features and programming present on or within an FDSAD, some of which are depicted in FIGS. 4A and 4C. The services depicted are examples only, and are not intended as limiting. For example, a user may be able to electronically sign and encrypt new data records, which can have multimedia capabilities. A user may be able to electronically submit data records to Service Stations or to other FDSADs on the network. FDSAD maintenance functions may be available, such as remote downloading of updates, execution of diagnostic routines, or other manual or automated maintenance functions. Messaging functions may be available to the user through the FDSAD. Such functions include, but are not limited to, SMS, email, phone, Voice-over-IP (VoIP), File Transfer Protocol (FTP), video conferencing, publish/subscribe services involving Service Stations or other FDSADs, web services, upload/download services, and wireless or wire-serviced communication interfaces.

Referring again to FIG. 4A, the process begins at start field surveillance block 200. Next, the user powers up the field FDSAD at block 202 which spawns background monitoring processes 204 shown in FIG. 4B. Optionally the user logs into the Service Station using a PIN, password, RFID chip, or biometric means shown at block 206. If the user wants to do field data/sample acquisition, block 208, then the user performs sample collection and/or electronic multi-media data acquisition using the FDSAD's built-in and/or (external)/Virtual Services as shown at block 210. Optionally, the user electronically and/or encrypts a new multi-media field data record as shown at block 212. Optionally, the user electronically submits new multi-media data record(s) to Service Station(s) and/or other FDSADs as shown at block 214.

If the user does not want to do field data/sample acquisition, block 208, and wants to perform FDSAD maintenance, block 216, then optionally the user invokes the FDSAD's manual or automated maintenance functions (e.g., remote download of software updates, executing diagnostics routines, etc.) as shown at block 218.

Referring also to FIG. 4C, if the user does not want to do field data/sample acquisition, block 208, and wants to do messaging, block 220, then optionally the user invokes the FDSAD's messaging functions (e.g., SMS, e-mailing, phone, VoiceOverIP, FTP, video conferences, publishes or subscribes to Service Stations and/or other FDSADs via web services, uploads or downloads multi-media data via memory storage module, wireless, and/or wire-serviced communications interface, etc.) as shown at block 222. If instead the user wants to shut down the FDSAD, block 224, the user powers down the FDSAD at block 228 and ends field surveillance at block 230. Optionally, prior to shut down, the FDSAD uses it communications interfaces to inform Service Stations and/or other FDSADs that it is going offline as shown at block 226.

Referring again to FIG. 4B, two background processes 204a, 204b are illustrated. In process 204a, the FDSAD listens for service request and situational awareness messages via its integrated communications interface(s) as shown at block 232. If the FDSAD receives a request or message, block 234, then the FDSAD performs a service request and/or updates its messaging board user interface as shown at block 236. In process 204b, the FDSAD searches for online service stations and other FDSADs via its available communications interfaces(s) as shown at block 238. If Service Stations and/or other FDSADs are found, block 240, then the FDSAD registers itself with online Service Station(s) and/or other FDSADs via its communications interface(s) as shown at block 242. Next, as shown at block 244, the FDSAD acquires service offerings from online Service Station(s) and/or FDSADs and adds those service to its own services list as Virtual Services. As shown at block 246, the FDSAD also removes Virtual Services that are no longer available from its service list. This step is also performed if no Service Stations and/or other FDSADs are found at block 240.

FIGS. 5 and 6 are outlines of one possible core service set that could be provided by a Service Station and an FDSAD, respectively, according to the architecture of the present invention. Depending on Service Station/FDSAD configuration and capabilities, some units may provide more or fewer services or functionality. This is merely one example of many possible service model embodiments.

In this embodiment, core services for a Service Station or FDSAD are grouped into five categories: Network Exploration 300, Network Registration 400, Maintenance 500, Field Data Acquisition 600, and Messaging 700. The following services are merely examples, and are not intended to be limiting.

The Network Exploration category contains services such as Locating Service Station(s) 302, Locating Field Devices 304, and Getting Service Interface(s) 306.

The Network Registration category contains services such as Register 402 and Unregister 404, pertaining to devices or stations.

The Maintenance category contains services such as Self Diagnostics Testing 502 and Getting Remote Updates 504.

The Field Data Acquisition category contains services such as Invoking Internal Service(s) 602, Invoking Network Service(s) 604, Importing 606, and Exporting 608.

The Messaging category contains services such as Sending 702, Receiving 704, Publishing 706, and Subscribing 708.

As noted above, a Service Station or an FDSAD can contain more services, fewer services, or different services than are included in this embodiment shown in FIGS. 5 and 6.

Benefits of Service-Oriented Surveillance Architecture

In the system of the present invention, plug-and-play operation for various types of surveillance equipment/technologies is supported, ranging from a simple paper notebook all the way to a mobile, robotic sensing platform. In addition, significant cost savings can be realized in the field due to on-the-fly automatic resource lookup and sharing. Fault tolerance is provided through ad-hoc networking and on-the-fly node discovery, which eliminates single-point failures.

Overall, the system exhibits simple integration and federation of local and remote systems through service oriented architecture. Computing platform- and FDSAD-independence is possible due to service layer abstraction and use of machine readable, standardized, interface and metadata description language(s) such as WSDL and XML. The system provides support for any type of wire-based and/or wireless communication protocol and does not enforce a certain control hierarchy or policy, such as "client/server". The system allows for 1-to-n, n-to-1, and n-to-m messaging between all nodes to meet needs of any type of surveillance application and allows for extension of communication coverage areas and distances by allowing FDSAD-level, point-to-point message routing through different types of wireless and/or wire-based networks.

The Virtual Service concept allows FDSAD to extend their capabilities on-the-fly, providing a more powerful surveillance system capability. The Service Station concept allows for resource sharing and coordination of small and large-scale field data acquisition and sampling operations. The Service-Oriented Surveillance Architecture approach and the use of meta data standards to describe service interfaces and data prevents vendor lock-in and allows for integration of on-site and off-site instrumentation and systems.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A flexible, service-oriented surveillance system architecture, comprising:
    a network; and
    at least one Field Data/Sample Acquisition Device (FDSAD);
    wherein said FDSAD provides a service-oriented interface and is utilized by multiple users simultaneously for information collection;
    wherein the system architecture allows for a variety of control hierarchies;
    wherein said service oriented interface comprises a communication layer and a service abstraction layer;
    wherein said service abstraction layer allows ad-hoc networking of said FDSAD.

2. An architecture as recited in claim 1, wherein said FDSAD provides a local user interface, a remote user interface, or a combination thereof.

3. An architecture as recited in claim 1, wherein said FDSAD provides local data storage, import capabilities and export capabilities; remote data storage, import capabilities, and export capabilities, or any combination thereof.

4. An architecture as recited in claim 1, wherein said FDSAD provides storage capabilities for field samples, sampling supplies, other sample-related information, or any combination thereof.

5. An architecture as recited in claim 1, wherein said FDSAD is utilized by one or more users simultaneously for information collection.

6. An architecture as recited in claim 1, further comprising:
    at least one Service Station;
    wherein said at least one Service Station manages access, information, and data from and related to said at least one FDSAD.

7. An architecture as recited in claim 6, further comprising:
    one or more system resources;
    wherein said resources are assigned to a Service Station and are locally or remotely accessible to other Service Stations and FDSADs.

8. An architecture as recited in claim 7, wherein said resources are dynamically located by Service Stations and FDSADs.

9. An architecture as recited in claim 6, wherein said Service Station relays information from other Service Stations or FDSADs; and whereby communication ranges for Service Stations and FDSADs are extended.

10. An architecture as recited in claim 6, wherein 1-n, n-to-1, and n to-m communication between Service Stations and FDSADs is allowed.

11. An architecture as recited in claim 6, wherein Service Stations and FDSADs subscribe to and share internal, external, physical, and electronic services, or any combination thereof.

12. An architecture as recited in claim 6, further comprising:
    one or more local or remote systems;
    wherein said local or remote systems subscribe to Service Stations, FDSADS, or any combination; and
    wherein said local or remote systems publish multimedia streams to and from Service Stations and FDSADs.

13. An architecture as recited in claim 6, wherein said Service Station provides a local user interface, a remote user interface, or a combination thereof.

14. An architecture as recited in claim 6, wherein said Service Station provides local data storage, import capabilities and export capabilities; remote data storage, import capabilities, and export capabilities, or any combination thereof.

15. An architecture as recited in claim 6, wherein said Service Station provides storage capabilities for field samples, sampling supplies, other sample related information, or any combination thereof.

16. An architecture as recited in claim 1, wherein said network can be wire-based, wireless, or a combination thereof.

17. An architecture as recited in claim 1, wherein said service-oriented interface can be accessed via a network, a local user interface, or a combination thereof.

18. An architecture as recited in claim 1, wherein service-oriented interface can be access-controlled.

19. An architecture as recited in claim 1, wherein service-oriented interface is machine interpretable.

20. An architecture as recited in claim 1, wherein service-oriented interface can be electronically exchanged via said network.

21. An architecture as recited in claim 1, wherein services being offered via said service-oriented interface can change over time.

22. An architecture as recited in claim 1, wherein services being offered via said service-oriented interface can be software services, hardware services, or a combination thereof.

23. An architecture as recited in claim 1, wherein metadata is used to describe device services and data within the abstraction layer.

24. An architecture as recited in claim 23, wherein the service abstraction layer provides decoupling of the communication layer and associated device hardware from the device services.

25. A flexible, service-oriented surveillance system architecture, comprising:
   a network; and
   a plurality of devices in communication with said network;
   wherein the system architecture allows for a variety of control hierarchies,
   including single and multi-level master/slave, peer-to-peer, and time and event-based control of said devices;
   wherein the plurality of said devices comprises service station and a plurality of Field Data/Sample Acquisition Devices (FDSAD) which are utilized by multiple users simultaneously for information collection;
   wherein each said FDSAD is configured to communicate with said network regarding other devices on said network; and
   wherein the network is configured so a first FDSAD routes information to the service station through a second FSDSAD.

26. An architecture as recited in claim 25,
   wherein the Service Station has a communication range;
   wherein a first FDSAD located outside said communication range may routes information through a second FDSAD to said Service Station for on-the fly communication range extension.

* * * * *